United States Patent [19]

Tchilinguirian

[11] Patent Number: 4,958,699

[45] Date of Patent: Sep. 25, 1990

[54] ANTI AUTO THEFT RETRACTABLE POLE

[76] Inventor: George G. Tchilinguirian, 46-12 218 St., Bayside, N.Y. 11361

[21] Appl. No.: 192,968

[22] Filed: Jul. 22, 1988

[51] Int. Cl.$^5$ .................................... B60R 25/10
[52] U.S. Cl. ........................... 180/287; 307/10.3
[58] Field of Search ................ 180/287; 307/9.1, 10.1, 307/10.2, 10.3; 340/901, 426

[56] References Cited

U.S. PATENT DOCUMENTS

| | | | |
|---|---|---|---|
| 3,673,562 | 6/1972 | Buell | 180/287 |
| 3,687,216 | 8/1972 | Tracy | 180/287 |
| 4,041,450 | 8/1977 | Knight | 180/287 |

Primary Examiner—Richard A. Bertsch

[57] ABSTRACT

For a motor vehicle, wherein the motor vehicle has an electrical battery and at least one of an ignition, a distributor, and headlights electrically connected to the battery by electrical wires, an anti-theft device having a pole member, and a housing. The housing has a bottom and a cover. The cover defines a pole aperture configured and dimensioned so as to allow at least a portion of the pole member to pass therethrough in reciprocating motion. A portion of the pole member is visible when a portion of the pole member is extending through the pole aperture. An electrical switch means is electrically connected to at least one of the electrical wires. The electrical switch means has an on position so as to maintain the electrical connection and an off position so as to disconnect the electrical connection. The electrical switch means is configured and dimensioned so as to be in the on position when the pole member is resting at the bottom of the housing and to be in the off position when at least a portion of the pole member is protruding through the pole aperture. The anti-theft device also includes a locking means so as to lock the pole member in a position whereat at least a portion of the pole member is protruding through the pole aperture.

20 Claims, 6 Drawing Sheets

ANTI AUTO THEFT RETRACTABLE POLE

BACKGROUND OF THE INVENTION

The present invention relates to anti-theft devices for motor vehicles. In the past, anti-theft devices have been either highly concealed electronic devices or mechanical devices which are fully detachable after use. All of those prior art devices have the great disadvantages of allowing the concealment of tampering with the device. With the prior art anti-theft devices, a motor vehicle which has had its anti-theft device avoided in some manner may, nevertheless, be unobtrusively operated.

SUMMARY OF THE INVENTION

My invention is simple, inexpensive, effective, and different.

It comprises a manually operated stainless steel pole with vertical grooves around its circumference colored in orange. To set it on, it should be pulled up by hand, out of its housing, to sit on top of the fender of the motor vehicle to be locked there automatically, and because of its size, color, and location, it will alert and attract attention and will act as a VISIBLE alarm; also, its base will disconnect the electric power flow which is running from the battery to at least one of the ignition, distributor, and the headlights of said motor vehicle.

To turn the alarm off, the pole should be unlocked and pushed down to be hidden in its housing, thereby reconnecting the electric flow.

Any motor vehicle protected by this device could never be driven, towed, moved unlawfully, since the said pole by being in its upmost position, will act as a visible alarm. Further, it is almost impossible to destroy this device without badly damaging the motor vehicle body at the area of the installation, thus reflecting tampering with the motor vehicle and its protective device.

Even the motor vehicle owner cannot start the engine of his car before unlocking and pushing the said pole down into its housing to reconnect the electric flow.

The initial cost of this device will be affordable, especially during the manufacturing of a new car.

The present invention includes an anti-theft device for a motor vehicle wherein the motor vehicle has an electrical battery and an ignition electrically connected by ignition wires forming an ignition connection; the anti-theft device comprising a pole member; a housing for the pole member; the housing having a bottom and a cover; the cover defining a pole aperture configured and dimensioned so as to allow at least a portion of the pole member to pass therethrough in reciprocating motion; a portion of the pole member being visible when a portion of the pole member is extending through the pole aperture; an electrical switch means electrically connected to the ignition wires; the electrical switch means having an on position so as to maintain the ignition connection, and an off position so as to disconnect the ignition connection and being configured dimensioned so as to be in the on position when the pole member is protruding through the pole aperture; and a locking means so as to lock the pole member in a position whereat at least a portion of the pole member is protruding through the pole aperture.

The top of the pole member may be substantially level with the cover when the pole member is resting at the bottom of the housing; and the pole member may further include a cap being configured and dimensioned so as to allow a person to grab the cap portion and pull the pole member upward. Further, the pole member may comprise a base portion disposed at the bottom of the pole member, the base portion having a cross sectional area greater than the cross sectional area of the pole member above the base portion; and the aperture being configured and dimensioned so as not to allow the base portion to pass therethrough.

The base portion may further comprise a lock cavity, the top of the lock cavity defining a lock abutment portion, the locking means comprising a biased latch automatically slidable beneath the lock abutment portion when the lock abutment portion is raised above the biased latch; and the locking means further comprising a key actuated latch removal means so as to remove the biased latch from beneath the lock abutment portion. Also the locking means may further comprise a release means configured and dimensioned so as to detach the key actuated latch removal means from the biased latch when the key actuated latch removal means is downwardly displaced; and the biased latch may further comprise a spring disposed adjacent the biased latch so as to bias the biased latch toward the pole member.

The housing may be attached to the motor vehicle, and the motor vehicle may have a fender panel and the housing may be attached to the motor vehicle behind the fender panel.

The device may also include a cable having a first end attached to the housing and a second end attached to the motor vehicle. The motor vehicle may also have a distributor electrically connected to the battery by distributor wires forming a distributor connection, and headlights electrically connected to the battery by headlight wires forming a headlight connection, the electrical switch means being electrically connected to the distributor wires and the headlight wires, and the electrical switch on position further maintaining the distributor connection; and the headlight connection electrical switch off position further disconnecting the distributor connection and the headlight connection.

The present invention further includes an anti-theft device for a motor vehicle wherein the motor vehicle has an electrical battery, an ignition switch electrically connected to the electrical battery by ignition wires forming an ignition connection, a distributor electrically connected to the electrical battery by distributor wires forming a distributor connection and at least one headlight electrically connected to the electrical battery by headlight wires forming a headlight connection; the anti-theft device comprising a pole member; a housing for the pole member; the housing having a bottom and a cover; defining a pole aperture configured and dimensioned so as to allow at least a portion of the pole member to pass therethrough in reciprocating motion; a portion of the pole member being visible when a portion of the pole member is extending through the pole aperture; the pole member further comprising a base portion disposed at the bottom of the pole member; the base portion having a cross sectional area greater than the cross sectional area of the pole member above the base portion; the pole aperture being configured and dimensioned so as not to allow the base portion to pass therethrough; an electrical switch means electrically connected to said ignition wires, said distributor wires, and said headlight wires; a switch aperture being provided in a wall of the housing at a position above the top of the base portion when the pole member is at rest at the bottom of the housing; the switch aperture being configured and dimensioned so as to allow a portion of the electrical switch to pass therethrough in reciprocating motion; the electrical switch being disposed adjacent to the switch aperture with a portion of the electrical switch protruding through the switch aperture when the top of said base portion is disposed beneath the switch aperture; the electrical switch being configured and dimensioned so as to disconnect the ignition connection, the distributor connection and the headlight connection when the top of the base portion upwardly passes the portion of the switch protruding through the switch aperture and a portion of the pole member protrudes through the pole aperture; and locking means so as to lock the pole member in a position whereat the top of the base portion is upwardly past the portion of the switch protruding through the switch aperture and a portion of the pole member protrudes through the pole aperture.

The present invention also includes an anti-theft device for a motor vehicle wherein said motor vehicle has an electrical battery and a distributor electrically connected by distributor wires forming a distributor connection; the anti-theft device comprising a pole member; a housing for the pole member; the housing having a bottom and a cover; the cover defining a pole aperture configured and dimensioned so as to allow at least a portion of the pole member to pass therethrough in reciprocating motion; a portion of the pole member being visible when a portion of the pole member is extending through the pole aperture; an electrical switch means electrically connected to the distributor wires; the electrical switch means having an on opposite so as to maintain the distributor connection and an off position so as to disconnect the distributor connection and being configured and dimensioned so as to be in the on position when the pole member is resting at the bottom of the housing and to be in the off position when at least a portion of the pole member is protruding through the pole aperture; and a locking means so as to lock the pole member in a position where at least a portion of the pole member is protruding through the pole aperture. The top of the pole member may be substantially level with the cover when the pole member is resting at the bottom of the housing. The motor vehicle may also have an ignition switch electrically connected to the electrical battery by ignition wires forming an ignition connection; the electrical switch further electrically connected to the ignition wires; the electrical switch on position further maintaining the ignition connection and the electrical switch off position further disconnecting the ignition connection.

DETAILED DESCRIPTION OF THE PREFERRED EMBODIMENTS

In the description which follows, any reference to orientation, size, or direction is intended primarily for the purpose of illustration, and is not intended in any way as a limitation of the scope of the present invention.

Figure 1:
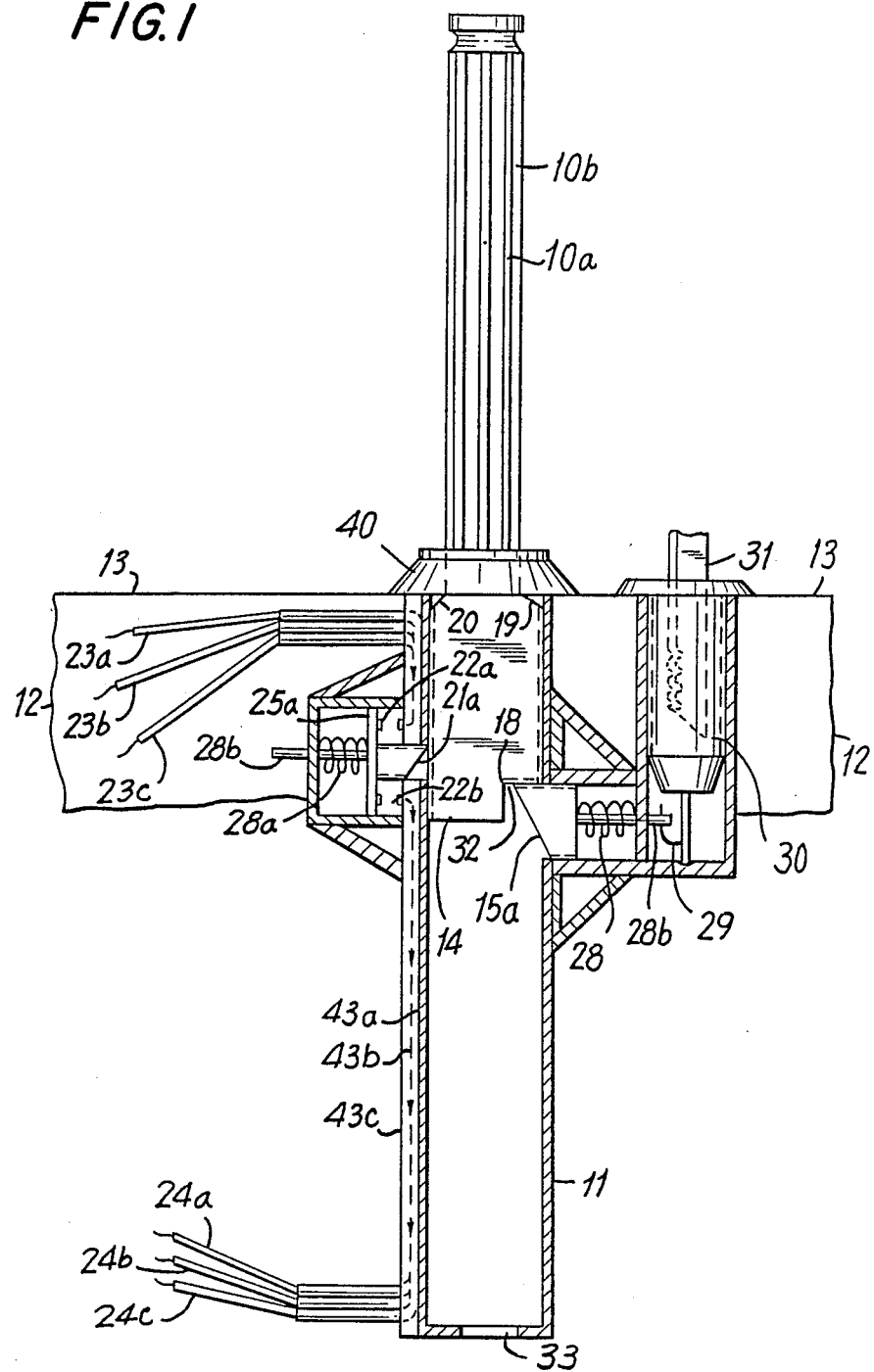
FIG. 1 is a front view of a device according to the present invention with a portion of the pole member extending through the pole aperture.

Turning now in detail to a description of the drawings:

FIG. 1 illustrates the pole member 10a in its upmost position, sitting on top of the fender 13 of a motor vehicle. Locked in this position by the latch 15a the pole member base 14 is pushing in a switch latch 21a creating an opening in the switch 25a at points 22a and 22b, disconnecting the electric flow which is running through the wires 23a, 23b, 23c, from the battery to the wires 24a, 24b, 24c, which are connected to the ignition, distributor, and the headlights of the motor vehicle, and for more safety, a space 32 has been left between the cut 18 at the bottom of the base 14 and the latch 15a so if at any time the lock 30 be destroyed, depressed downward, or tampered with, as by a thief, the hook 29 will release the latch 15a which will be pushed in the space 32 by a spring 28 and be out of reach.

Figure 2:
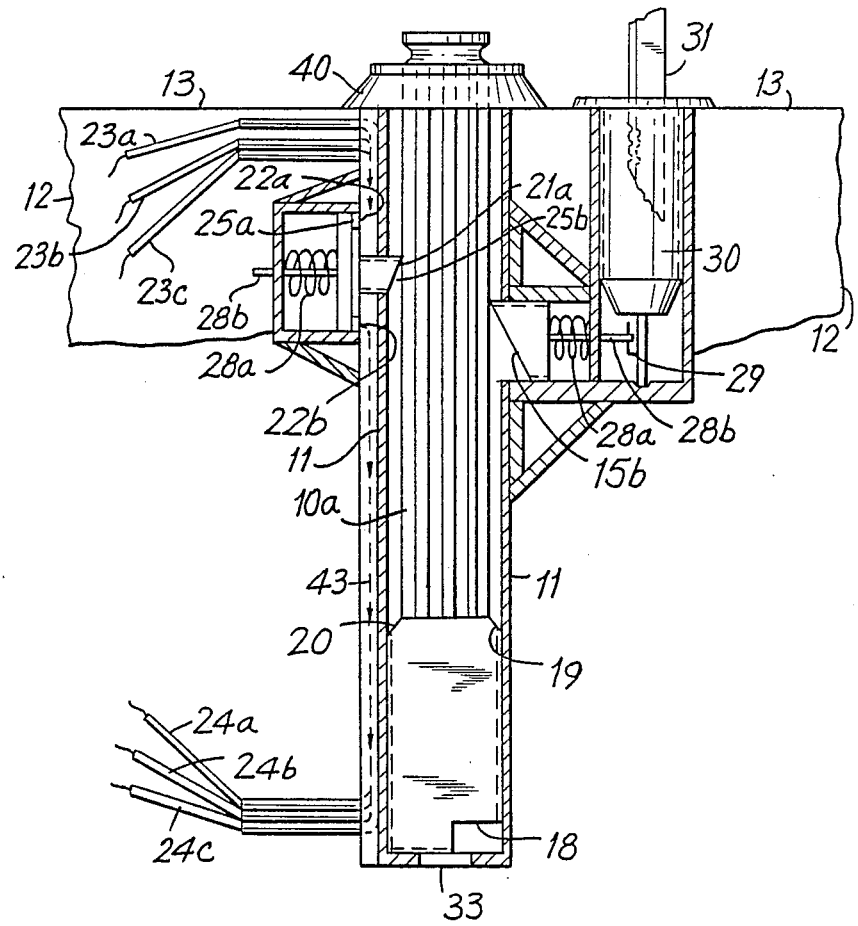
FIG. 2 is a front view of a device according to the present invention with the pole member resting at the bottom of the housing.

FIG. 2, illustrates an anti-theft device in off position with the electrical switch in on position, since the pole 10a has been unlocked 31 and pushed down to be hidden in its housing 11 behind the panel 12 of the fender 13, and at the same time allowing the latch 21a to slide in a space 25b between the wall of the housing 11 and the pole 10a to close the gap in the switch 22a and 22b to connect the wires 23a, 23b, 23c, which are running from the battery to the switch 25a and the wires 24a, 24b, 24c, which are running from the switch 25a to the ignition, distributor, and to the headlights.

The opening 33 has been left at the bottom of the housing 11 to let the air out while the base 14a is on its way down, and to allow the water to drain.

Figure 3:
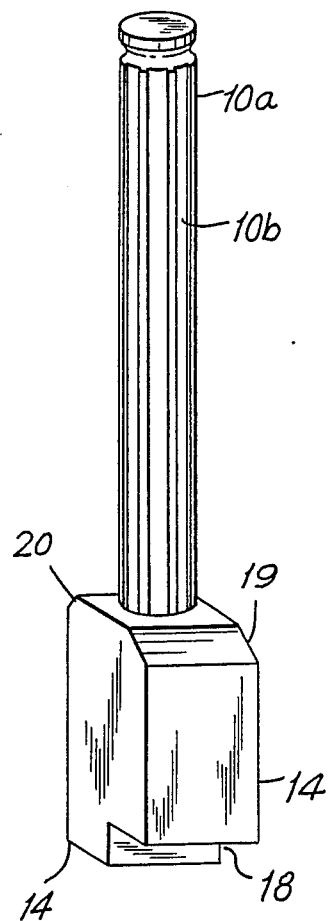
FIG. 3 is a partial front view of a device according to the present invention showing the pole and its base.

FIG. 3 illustrates the pole 10a, its orange colored grooves 10b, and its base 14. Special shaped cuts 19 and 20 are provided on two top corners of the base 14 to allow the latches 15a and 21a to slide back and be pushed easily while the base 14 is on its way up.

Figure 4A:
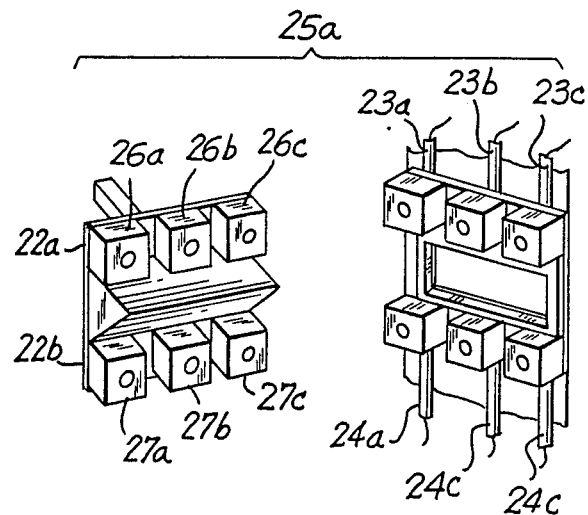
FIG. 4a is a front view of an electrical switch means according to the present invention.

FIG. 4a illustrates the electric wires and the switch 25a in more detail. 23a, 23b, and 23c are the wires running from the battery to the switch. 24a, 24b, and 24c, are the wires running from the switch to the ignition, distributor, and the headlights. 22a and 22b are the connecting and disconnecting points in the switch. 26a, 26b, and 26c are connected to 27a, 27b and 27c allowing the electric flow to run from 23a, 23b, 23c to 24a, 24b and 24c.

Figure 4B:
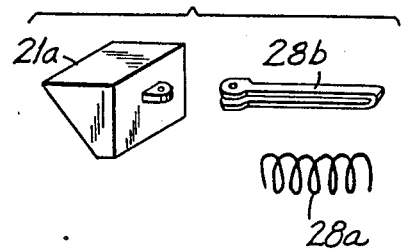
FIG. 4b is the latch according to the present invention.

FIG. 4b 21a is the latch with its arm 28b and its spring 28a.

Figure 5A:
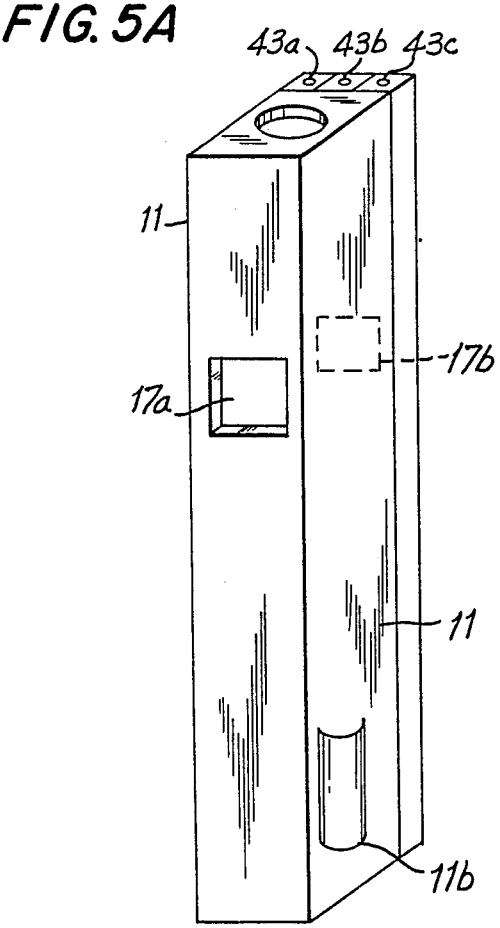
FIG. 5a is a front, side and top view of a housing according to the present invention.

FIG. 5a illustrates the housing 11 and the channels 43a, 43b and 43c to hide and protect the wires 23a, 23b, 23c, 24a, 24b, 24c, and keep them out of reach, and 17a 17b are opening in the housing 11 to allow the latches 15a and 21a to slide in and out.

Figure 5B:
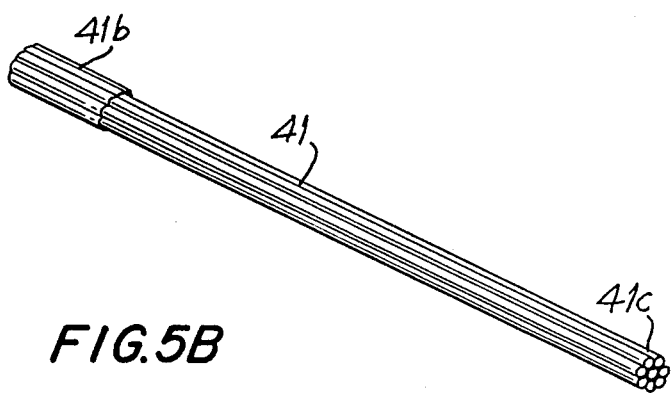
FIG. 5b is a cable according to the present invention.

FIG. 5b is a steel cable to be attached to the housing 11 from its top 41b to 11b and to be welded from its other end 41c to the chassis of the car.

Figure 6A:
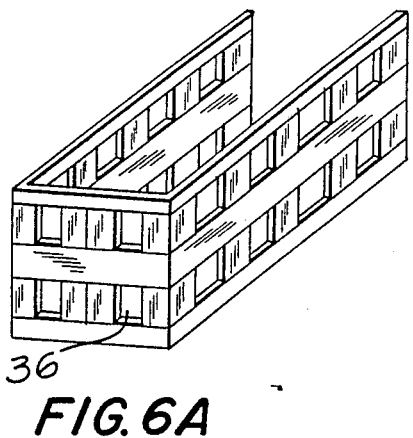
FIG. 6a is a top, side and back view of an installation part according to the present invention.

FIG. 6a is a special installation part to be welded to the panel 12 of the fender 13 from behind and the sides of the housing 11 through the openings 36.

Figure 6B:
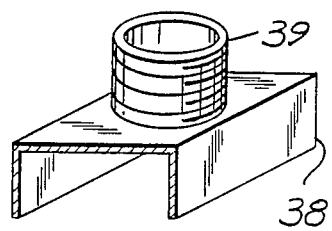
FIG. 6b is a side and top view of a second installation part according to the present invention.

FIG. 6b is a housing designed to fit on top of the housing 11 and hold it from its two sides 38 and comes out through its neck 39 on top of the fender 13.

Figure 6C:
FIG. 6c is a side and top view of a third installation part according to the present invention.

FIG. 6c is a knot 40 designed to be mounted to the part 39.

Figure 7:
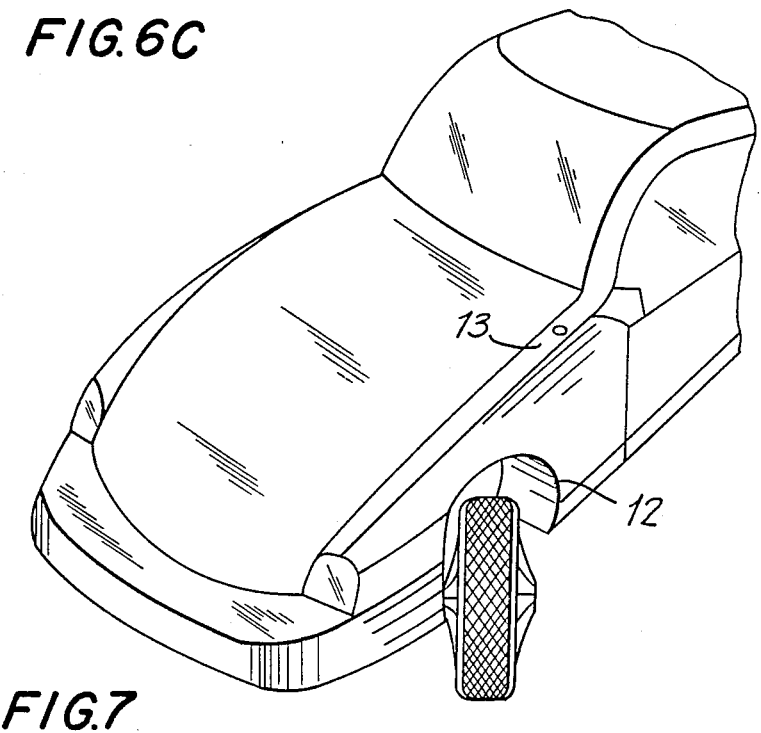
FIG. 7 is a view of the front, hood and fender of a car according to the present invention.

FIG. 7 is the top of the fender 13 and the panel 12 where the device should be installed.

What I claim is:

1. An anti-theft device for a motor vehicle wherein said motor vehicle has an electrical battery and an ignition electrcially connected by ignition wires forming an ignition connection; said anti-theft device comprising a pole member; a housing for said pole member; said housing having a bottom and a cover; said cover defining a pole aperture configured and dimensioned so as to allow at least a portion of said pole member to pass therethrough in reciprocating motion; a portion of said pole member being visible when a portion of said pole member is extending through said pole aperture; an electrical switch means electrically connection to said ignition wires; said electrical switch means having an on position so as to maintain said ignition connection and an off position so as to disconnect said ignition connection and being configured and dimensioned so as to be in said on position when said pole member is resting at the bottom of said housing and to be in said off position when at least a portion of said pole member is protruding through said pole aperture; and a locking means so as to lock said pole member in a position where at least a portion of said pole member is protruding through said pole aperture.

2. An anti-theft device according to claim 1, wherein said pole member further comprises a cap portion on top of said pole member, said cap portion being configured and dimensioned so as to be substantially level with said cover when said pole member is resting at the bottom of the housing and so as to allow a person to grab said cap portion and pull said pole member upwardly.

3. An anti-theft-device accordinng to claim 2 wherein said pole member further comprises a base portion disposed at the bottom of said pole member, said base portion having a cross sectional area greater than the cross sectional area of the pole member above the base portion; and said aperture being configured and dimensioned so as not to allow said base portion to pass therethrough.

4. An anti-theft device according to claim 3 wherein said base portion further comprises a lock cavity; the top of said lock cavity defining a lock abutment portion; said locking means comprising a biased latch, said biased latch being configured and dimensioned so as to be automatically slidable beneath said lock abutment portion when said lock abutment portion is raised to a position vertically higher than said biased latch and said locking means further comprising a key actuated latch removal means attached to said biased latch and configured and dimensioned so as to remove said biased latch from beneath said lock abutment portion.

5. An anti-theft device according to claim 4 wherein said locking means further comprises a release means configured and dimensioned so as to detach said key actuated latch removal means from said biased latch when said key actuated latch removal means is downwardly displaced; and said biased latch further comprising a spring disposed adjacent said biased latch so as to bias said biased latch towards said pole member.

6. An anti-theft device according to claim 5 wherein said housing is attached to said motor vehicle.

7. An anti-theft device for a motor vehicle according to claim wherein said motor vehicle comprises a motor and a fender panel disposed adjacent said motor, said fender panel having a back portion which faces toward said motor and said housing is attached to said motor vehicle adjacent to said back portion of said fender panel.

8. An anti-theft device according to claim 7 further comprising a cable having a first end attached to said housing and a second end attached to said motor.

9. An anti-theft device according to claim 8 wherein said motor vehicle has a distributor electrically connected to said electrical battery by distributor wires forming a distributor connection and headlights electrically connected to said electrical battery by headlight wires forming a said headlight connection, said electrical switch means being electrically connected to said distributor wires and said headlight wires; and said electrical switch on position further maintaining said distributor connection and said headlight connection; and said electrical switch off position further disconnecting said distributor connection and said headlight connection.

10. An anti-theft device for a motor vehicle wherein said motor vehicle has an electrical battery, an ignition switch electrically connected to said electrical battey by ignition wires forming an ignition connection; a distributor electrically connected to said electrical battery by distributor wires forming a distributor connection and at least one headlight electrically connected to said electrical battery by headlight wires forming a headlight connection; said anti-theft device comprising a pole member; a housing for said pole member; said housing comprising a wall, a bottom, and a cover defining a pole aperture configured and dimensioned so as to allow at least a portion of said pole member to pass therethrough in reciprocating motion; a portion of said pole member being visible when a portion of said pole member is extending through said pole aperture; said pole member further comprising a base portion disposed at the bottom of said pole member; said base portion having a cross sectional area greater than the cross sectional area of the pole member above the base portion; said pole aperture being configured and dimensioned so as to not allow said base portion to pass therethrough; an electrical switch means electrically connected to said ignition wires, said distributor wires, and said headlight wires; a switch aperture being provided in said wall of said housing at a portion above the top of said base portion when said pole member is at rest at the bottom of said housing; said switch aperture being configured and dimensioned so as to allow a portion of said electrical switch to pass therethrough in reciprocating motion; said electrical switch being disposed adjacent said switch aperture with a portion of said electrical switch protruding through said switch aperture when the top of said base portion is disposed beneath said switch aperture; said electrical switch being configured and dimensioned so as to disconnect said ignition connection, said distributor connection and said headlight connection when the top of said base portion upwardly passes said portion of said switch protruding through said switch aperture and a portion of said pole member protrudes through said pole aperture; and locking means so as to lock said pole member in a position whereat the top of said base portion is upwardly past said portion of said switch protruding through said switch aperture and a portion of said pole member protrudes through said pole aperture.

11. An anti-theft device according to claim 10 wherein said pole member further comprises a cap portion on top of said pole member; said cap portion being configured and dimensioned so as to be substantially level with said cover when said pole member is resting at the bottom of said housing and so as to allow a person to grab said cap portion and pull said pole member upward.

12. An anti-theft device according to claim 11 wherein said portion further comprises a lock cavity, the top of said lock cavity defining a lock abutment portion; said locking means comprising a biased latch, said biased latch being configured and dimensioned so as to be automatically slidable beneath said lock abutment portion when said lock abutment portion is raised to a position vertically higher than said biased latch; and said locking means further comprises a key actuated latch removal means attached to said biased latch and configured and dimensioned so as to remove said biased latch from beneath said lock abutment portion.

13. An anti-theft device according to claim 12 wherein said locking means further comprises a release means configured and dimensioned so as to detach said key actuated latch removal means when said key actuated latch removal means is downwardly displaced; and said biased latch further comprising a spring disposed adjacent said biased latch so as to bias said biased latch toward said pole member.

14. An anti-theft device according to claim 13 wherein siad housing is attached to said motor vehicle.

15. An anti-theft device according to claim 14 wherein said motor vehicle comprises a motor and a fender panel disposed adjacent said motor, said fender panel having a back portion which faces toward said motor and said housing is attached to said motor vehicle adjacent said back portion of said fender panel.

16. An anti-theft device according to claim 15 further comprising a cable having a first end attachment to said housing and a second end attached to said motor vehicle.

17. An anti-theft device for a motor vehicle wherein said motor vehicle has an electrical battery and a distributor connected by distributor wires forming a distributor connection; said anti-theft device comprising a pole member; a housing for said pole member, siad housing having a bottom and a cover; said cover defining a pole aperture configured and dimensioned so as to allow at least a portion of said pole member to pass therethrough in reciprocating motion; a portion of said pole member being visible when a portion of said pole member is extending through said pole aperture; an electrical switch means electrically connected to said distributor wires; said electrical switch means having an on position so as to maintain said distributor connection and an off position so as to disconnect said distributor connection and being configured and dimensioned so as to be in said on position when said pole member is resting at the bottom of said housing and to be in said off position when at least a portion of said pole member is protruding through said pole aperture; and a locking means so as to lock said pole member in a position whereat at least a portion of said pole member is protruding through said pole aperture.

18. An anti-theft device according to claim 17 wherein the top of said member is substantially level with said cover when said pole member is resting at the bottom of said housing; and said pole membre further comprises a cap portion at the top of said pole member; said cap portion being configured and dimensioned so as to allow a person to grab said cap portion and pull said pole member upward.

19. An anti-theft device according to claim 18 wherein said pole member defines a lock cavity having a top end, the top end of said lock cavity defining a lock abutment, said locking means comprising a spring biased latch, said spring biased latch being configured and dimensioned so as to be automatically slidable beneath said lock abutment when said lock abutment is raised to a position vertically higher than said spring biased latch and said locking means further comprising a key actuated latch removal means attached to said spring biased latch and configured and dimensioned so as to remove said spring biased latch from beneath said lock abutment.

20. An anti-theft device according to claim 19 wherein said motor vehicle also has an ignition switch electrically connected to said electrical battery by ignition wires forming an ignition connection; said electrical switch further electrically connected to said ignition wires; said electrical switch on position further maintaining said ignition connection and said electrical switch off position further disconnecting said ignition connection.

* * * * *